United States Patent [19]

Kogo et al.

[11] Patent Number: 4,849,838
[45] Date of Patent: Jul. 18, 1989

[54] LARGE CAPACITY INFORMATION STORAGE APPARATUS USING A PLURALITY OF MAGNETIC DISK UNITS

[75] Inventors: Masanori Kogo, Sendai; Yoshihiro Ino, Tokyo, both of Japan

[73] Assignee: Tokin Corporation, Miyagi, Japan

[21] Appl. No.: 39,302

[22] Filed: Apr. 16, 1987

[30] Foreign Application Priority Data

Apr. 16, 1986 [JP] Japan .................................. 61-85874
Sep. 22, 1986 [JP] Japan .......................... 61-145493[U]

[51] Int. Cl.⁴ .............................................. G11B 19/00
[52] U.S. Cl. .................................. 360/69; 360/280.05; 360/133; 369/30
[58] Field of Search ..................... 360/69, 98, 72.2, 71, 360/92, 98.04, 98.05, 133; 369/30, 36, 198

[56] References Cited

U.S. PATENT DOCUMENTS

4,453,188 6/1984 Johnson ............................ 360/98 X
4,675,755 6/1987 Baumeister ....................... 360/98 X

*Primary Examiner*—A. J. Heinz
*Attorney, Agent, or Firm*—Frishauf, Holtz, Goodman & Woodward

[57] ABSTRACT

An information storage apparatus (20) used in combination with an information processing device utilizes a plurality of magnetic disk units (22). The units are individually stocked in stocking locations of a stocking device (23). The stocking locations are assigned with different address numbers. On receiving an incoming signal from the information processing device, one of the units loaded into a disk driver (24) by a transporting device (49, 50) and a desired information data is recorded or reproduced on a flexible magnetic disk of the unit. The unit is thereafter returned to the initial location of the stocking device. Each of the units may have a recording medium. A recording and reproducing device (57) records or reproduces address information on the medium of the unit during transportation of the unit. After a part of a series of information data is recorded in one of the disk units and a remaining portion of the data is recorded in another, the series of information data can be reliably and readily reproduced from the two disk units with reference to the address information on the media of the two disk units.

15 Claims, 4 Drawing Sheets

| 2nd MEMORY AREA | | |
|---|---|---|
| ADDRESS NUMBER | TITLE CODE | STATE INFORMATION CODE |
| 0000 | NAME | 10 |
| 0001 | LETTER | 01 |
| 0010 | | 00 |
| | | |
| 1111 | | |

FIG.6

LARGE CAPACITY INFORMATION STORAGE APPARATUS USING A PLURALITY OF MAGNETIC DISK UNITS

BACKGROUND OF THE INVENTION (1) Field of the Invention

This invention relates to an information storage apparatus for use in combination with an information processing device, for example, a personal computer or the like, and, more particularly, to an information storage apparatus using a conventional magnetic disk unit having a flexible magnetic disk.

(2) Description of the Prior Art

The conventional magnetic disk unit comprises a container and a flexible magnetic disk contained in the container. Such containers are generally classified into two types. A container of the first type is made of a thin and soft plastic material and is therefore called a soft jacket in the art. A container of a second type is made of a thick and hard plastic material. The container of the second type is therefore called either a hard jacket or a cartridge in the art. Each of the containers of the first and the second types has an opening for permitting a recording and/or reproducing head to access the flexible magnetic disk.

The flexible magnetic disk is for magnetically recording filing information, such as computer program and/or data to be processed by the information processing device. The flexible magnetic disk is well known in the art as a floppy disk.

In order to record and/or reproduce the filing information on the flexible magnetic disk, a magnetic disk recording and/or reproducing device is used which has the above-mentioned magnetic recording and/or reproducing head. When the magnetic disk unit is loaded into the magnetic disk recording and/or reproducing device, the filing information can be recorded and/or reproduced by the head accessing the flexible magnetic disk. Thus, the magnetic disk recording and/or reproducing device drives the magnetic disk unit to carry out operation of one of magnetic recording and magnetic reproducing of the filing information on the flexible magnetic disk of the magnetic disk unit loaded thereto. From this standpoint, the magnetic disk recording and/or reproducing device is also called a disk driving device.

The flexible magnetic disk of the magnetic disk unit has a predetermined recording capacity. When the filing information has the amount exceeding the predetermined recording capacity, the magnetic disk unit must be exchanged for another magnetic disk unit by an operator of the magnetic disk recording and/or reproducing device.

For a large capacity information storage apparatus, a hard disk storage apparatus is known in the art which comprises an accessing head and a plurality of hard magnetic disks.

The hard disk storage apparatus is, however, expensive because the hard magnetic disk has a cost higher than that of the flexible magnetic disk. In addition, the hard disk storage apparatus is generally incapable of exchanging the hard magnetic disk for another hard magnetic disk. It is therefore necessary to prepare a streamer tape for the purpose of backup for protection of memorized information of the hard magnetic disks.

SUMMARY OF THE INVENTION

It is therefore an object of this invention to provide an information storage apparatus having a large recording capacity achieved by using a plurality of magnetic disk units, each of the units having a flexible magnetic disk.

Other object of this invention will become clear as the description proceeds.

According to this invention, a large capacity information storage apparatus for use in combination with an information processing device is realized by use of a plurality of magnetic disk units, each of the magnetic disk units comprising a container and a flexible magnetic disk having a predetermined recording capacity for magnetically recording information. The magnetic disk units are stocked within stocking means having a plurality of stocking locations for stocking the magnetic disk units in different stocking locations, individually. The stocking locations are assigned with different address numbers. The apparatus comprises disk driving means for carrying out operation of one of magnetic recording and magnetic reproducing of a series of filing information data on the flexible magnetic disk of the magnetic disk unit loaded within the disk driving means. The one of magnetic recording and magnetic reproducing is designated by an operation mode signal. The apparatus further comprises signal receiving and transmitting means for receiving an incoming signal from the information processing device and for transmitting an outgoing signal to the information processing device, and signal processing means coupled to the signal receiving and transmitting means. The signal processing means is responsive to the incoming signal and processes the incoming signal into the operation mode signal and an address signal representative of a specific one of the address numbers. Responsive to the address signal, transporting means transports and loads to the disk driving means a specific one of the magnetic disk units stocked in a specific one of the stocking locations corresponding to the specific address number represented by the address signal.

When the incoming signal comprises a recording instruction, a series of filing information data can be recorded, and a title of the series of filing information data, the signal processing means processes the incoming signal into the address signal and the operation mode signal designating the magnetic recording operation, so that the disk driving means carries out the magnetic recording operation of the series of filing information data with the title into the flexible magnetic disk of the specific magnetic disk unit loaded therein.

When the signal processing means detects and processes an end signal in the incoming signal into a drive stop signal and a return signal, the disk driving means stops the magnetic recording operation in response to the drive stop signal. The transporting means transports, in response to the return signal, the specific magnetic disk unit from the disk driving means to the specific stocking location of the stocking means.

When the incoming signal comprises a reproducing instruction and a title of a series of filing information data to be reproduced, the signal processing means processes the incoming signal into the address signal and the operation mode signal designating the magnetic reproducing operation. The address signal is representative of a particular address number as the specific address number. The particular address number is assigned to a particular stocking location which stocks, as the specific magnetic disk unit, a particular magnetic disk unit containing the flexible magnetic disk which records the series of filing information data having the title. The disk driving means thereby carries out the magnetic reproducing operation of the series of filing information data having the title from the flexible magnetic disk of the particular magnetic disk unit loaded therein to produce a reproduced signal. The signal receiving and transmitting means transmits the reproduced signal as the outgoing signal to the information processing device.

The signal processing means produces a drive stop signal and a return signal when a whole of the information data is reproduced from the flexible magnetic disk of the particular magnetic disk unit loaded therein. The disk driving means stops the reproducing operation in response to the drive stop signal, and the transporting means transports, in response to the return signal, the particular magnetic disk unit from the disk driving means to the particular stocking location of the stocking means.

Each of the magnetic disk units has a magnetic recording medium mounted on an outer container surface of the container. The apparatus further comprises magnetic recording and reproducing means disposed so as to record or reproduce information on the magnetic recording medium of the magnetic disk unit during transportation of the magnetic disk unit. In an aspect of this invention, an address information is recorded and reproduced on the magnetic recording medium, so that a series of filing information data can be recorded over two or more magnetic disk units and can be reproduced therefrom without error.

DESCRIPTION OF THE PREFERRED EMBODIMENT

Figure 1:
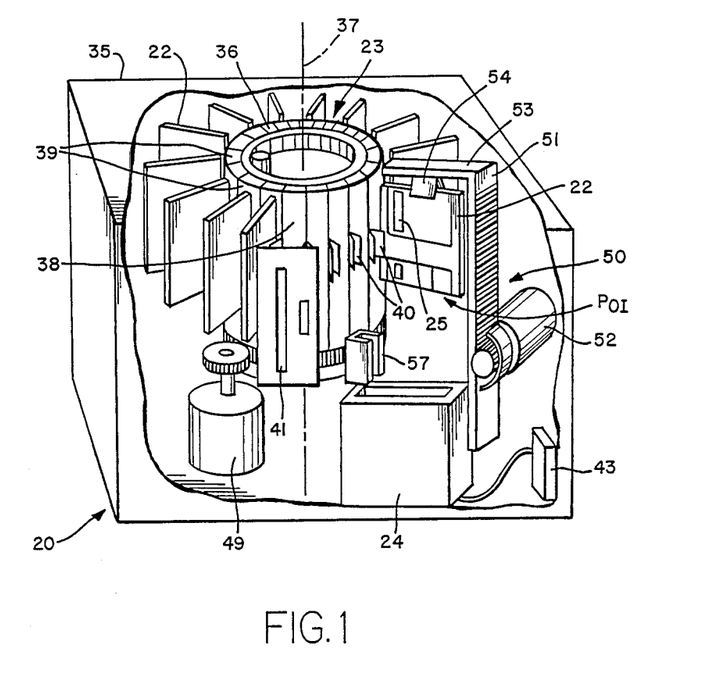
FIG. 1 is a partially broken perspective view of an information storage apparatus according to an embodiment of this invention.
Figure 2:
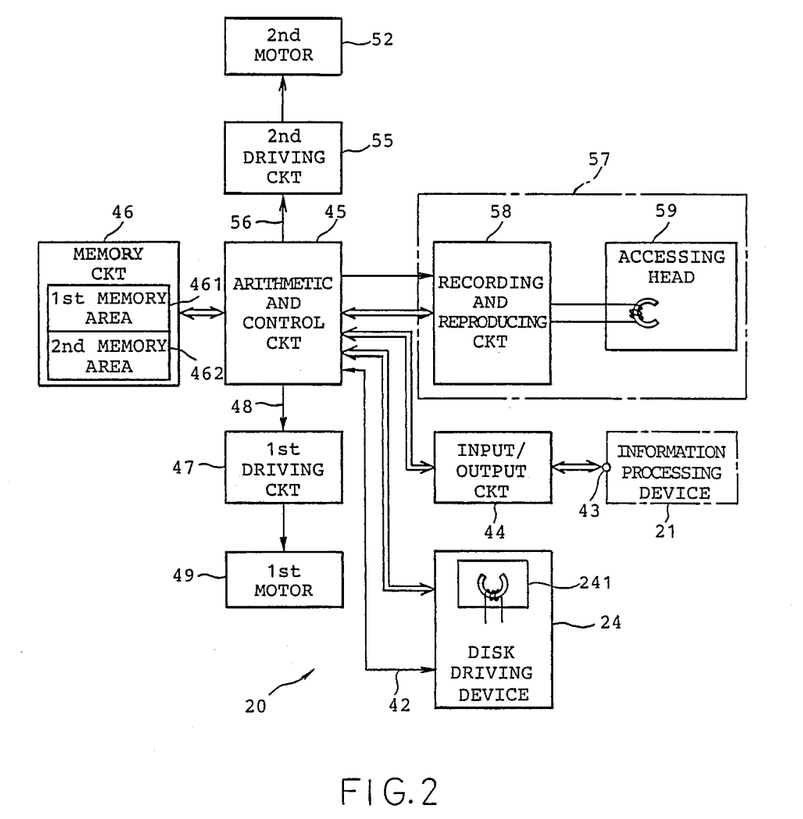
FIG. 2 is a block circuit view of the information storage apparatus illustrated in FIG. 1.

Referring to FIGS. 1 and 2, a large capacity information storage apparatus 20 according to an embodiment of this invention is for use in combination with an information processing device 21, such as a personal computer or the like. The information storage apparatus 20 comprises a plurality of magnetic disk units 22, a stocking device 23 for the disk units 22, and a magnetic disk recording and/or reproducing device, that is, a disk driving device 24.

Figure 3:
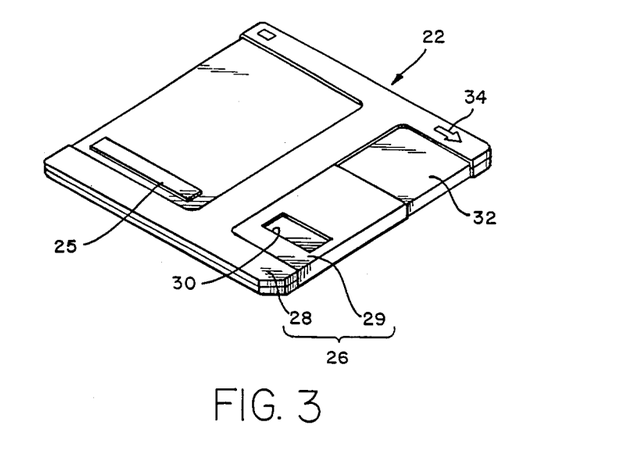
FIG. 3 is a perspective view of a magnetic disk unit used in the information storage apparatus illustrated in FIG. 1.
Figure 4:
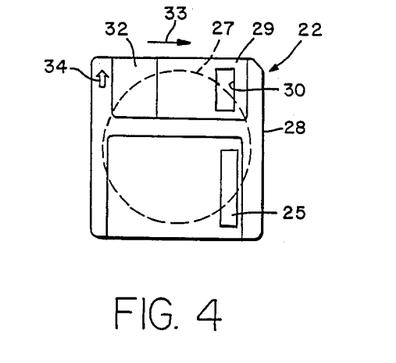
FIG. 4 is a front view of the magnetic disk unit illustrated in FIG. 3 with a shutter closing a casing opening.
Figure 5:
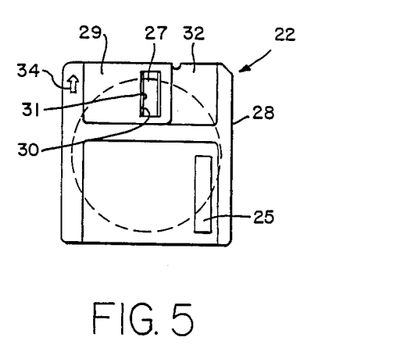
FIG. 5 is a front view of the magnetic disk unit illustrated in FIG. 3 with the shutter moved to open the casing opening.

Temporarily referring to FIGS. 3, 4, and 5, each of the magnetic disk units 22 is a conventional one except for a magnetic recording film 25 and comprises a container 26 and a flexible magnetic disk 27 contained in the container 26. The flexible magnetic disk 27 has a diameter of, for example, 3.5 inches. The flexible magnetic disk 27 has a predetermined recording capacity for magnetically recording filing information.

The container 26 comprises a containing casing 28 for containing the flexible magnetic disk 27 and a shutter 29 having a pair of shutter openings 30. The shutter 29 is made of, for example, a metal or a plastic material. The containing casing 28 is made of a thick and hard plastic material so as to form a hard jacket or a cartridge.

The containing casing 28 has a pair of casing openings 31 for permitting a magnetic recording and/or reproducing head 241 of the disk drive device 24 (FIGS. 1 and 2) to access the flexible magnetic disk 27 therethrough. The containing casing 28 further has an outer casing surface restricted by the casing opening pair 31.

The shutter 29 is mechanically coupled to the containing casing 28 to shut the casing opening pair 31 as depicted in FIGS. 3 and 4. The shutter 29 is slidable on a preselected area 32 of the outer casing surface to selectively open the casing opening pair 31 through the shutter opening pair 30 as depicted in FIG. 5. The shutter 29 is energized by a spring (not shown) in a direction designated by an arrow 33 illustrated in FIG. 4 and therefore shuts the casing opening pair 31 normally.

When the magnetic disk unit 22 is inserted into the disk driving device 24 (FIGS. 1 and 2) in a direction designated by an arrow 34 indicated on the containing casing 28, the shutter 29 is forcedly slidden to open the casing opening pair 31. As a result, the shutter opening pair 30 and the casing opening pair 31 are located under the magnetic recording and/or reproducing head 241. In this state, the filing information can be recorded and/or reproduced on the flexible magnetic disk by access of the head.

The magnetic recording film 25 is mounted on a predetermined area of the outer casing surface except the preselected area 32. The magnetic recording film 25 is for magnetically recording address data which will later be described.

The magnetic recording film 25 may be a magnetic plate or a magnetic tape comprising a carrier tape and a magnetic layer coated on the carrier tape.

Referring back to FIG. 1, the information storage apparatus 20 comprises a housing 35 in which the stocking device 23 and the disk driving device 24 are contained.

The stocking device 23 comprises a cylindrical member 36 which has a center axis 37 and an outer cylindrical surface 38 around the center axis 37. The cylindrical member 36 is rotatable around the center axis 37. The cylindrical member 36 has a plurality of stocking locations 39 angularly spaced on the outer cylindrical surface 38. The stocking locations 39 are assigned with different address numbers. A plurality of catching units 40 are fixed at the stocking locations 39 on the outer cylindrical surface 38, respectively. Each of the catching units 40 has a pair of leaf springs confronting with each other. Each of the magnetic disk units 22 is held by the leaf spring pair. Thus, the plurality of the catching units 40 catch the plurality of the magnetic disk units 22, respectively.

The housing 35 has an opening 41 for previously inserting the magnetic disk units 22 one after another into respective stocking locations 39 of the stocking device 23, so as to be caught by the catching units 40. In this event, such insertion of the respective magnetic disk units 22 is carried out by manually rotating the cylindrical member 36 around the center axis 37.

The stocking device 23 is provided with an outlet and inlet position $P_{OI}$ which is predetermined relative to the housing 35.

The disk driving device 24 carries out operation of one of magnetic recording and magnetic reproducing of the filing information on the flexible magnetic disk 27 (FIG. 5) of the magnetic disk unit 22 loaded into the disk driving device 24. The one of the magnetic recording and the magnetic reproducing is designated by an operation mode signal supplied through a signal transmission line 42 (FIG. 2).

Referring to FIG. 2 together with FIG. 1, an interface connector 43 is for electrically connecting the information storage apparatus 20 to the information processing device 21. An input/output circuit 44 is coupled to the interface connector 43 and the disk driving device 24. The input/output circuit 44 is operable as a signal receiving and transmitted circuit for receiving an incoming signal from the information processing device 21 through the interface connector 43 and for transmitting an outgoing signal to the information processing device 21 through the interface connector 43. The input/output circuit 44 transfers the incoming signal to an arithmetic and control circuit 45.

The incoming signal comprises a recording/reproducing instruction code. Accompanying with the recording instruction code, the incoming signal further comprises a series of filing information data to be recorded on the flexible magnetic disk, a title of the series of filing information data, and an end signal of the series of filing information. While, accompanying with the reproducing instruction code, the incoming signal further comprises a title of a series of filing information to be reproduced from the flexible magnetic disk.

The arithmetic and control circuit 45 is coupled to the input/output circuit 44 and starts arithmetic and control operation in response to the incoming signal from the input/output circuit 44.

A memory circuit 46 is coupled to the arithmetic and control circuit 45 and has a first memory area 461 storing an operation program and a second memory area 462 for storing a list of the address numbers, state information codes of the magnetic disk units corresponding to the respective address numbers, and title codes of series of filing information data recorded in the magnetic disk units.

A combination of the arithmetic and control circuit 45 and the memory circuit 46 is operable as a signal processing circuit for processing the incoming signal to produce an address signal representative of a specific one of the address numbers and the operation mode signal for the disk driving device 24.

A first driving circuit 47 receives the address signal from the signal processing circuit through a line 48 and drives a first motor 49 to rotate the cylindrical member 36 so as to position to the outlet and inlet position $P_{OI}$ a specific one of the magnetic disk units 22 stocked in a specific one of the stocking locations corresponding to the specific address number represented by the address signal.

A conveying device 50 is disposed in the housing 35 to move between the outlet and inlet position $P_{OI}$ and the disk driving device 24. The conveying device 50 comprises a carrier member 51 of a shape of an up-down letter of "L" and a second motor 52 for vertically moving the carrier member 51. The carrier member 51 comprises a top plate 53 having a lower surface. A catching unit 54 is fixed on the lower surface and has a pair of leaf springs confronting with each other. The catching unit 54 catches a top of the magnetic disk unit 22 positioned at the outlet and inlet position $P_{OI}$.

The second motor 52 is coupled to the arithmetic and control circuit 45 through a second driving circuit 55. When the arithmetic and control circuit 45 produces a driving signal for the second driving circuit 55 through a line 56, the second driving circuit 55 drives the second motor 52 to vertically move the carrier member 51. Thus, the conveying device 50 downwardly conveys the specific magnetic disk unit 22 to the disk driving device 24.

Thus, a transporting device for transporting a magnetic disk unit from the stocking device 23 to the disk driving device 24 is constituted by the first motor 49, the second motor 52, and the conveying device 50.

When the specific magnetic disk unit 22 is loaded into the disk driving device 24 by the conveying device 50, the disk driving circuit 24 starts the operation designated by the operation mode signal from the arithmetic and control circuit 45.

When the operation of the disk driving device 24 is completed for the specific magnetic disk unit 22, the arithmetic and control circuit 45 generates a drive stop signal to stop the disk driving device 24 and also generates another driving signal for the second driving circuit 55 to drive the second motor 52 in a reversed direction. So that the specific magnetic disk unit 22 is caught by the catching unit 54 and is upwardly moved by the conveying device 50 from the disk driving device 24 to the specific stocking location positioned at the outlet and inlet position $P_{OI}$.

A recording and reproducing device 57 has a recording and reproducing circuit 58 and an accessing head 59 and is disposed along a moving path of the conveying device 50. The accessing head 59 is disposed between the stocking device 23 and the disk driving device 24 so that the accessing head 59 comes into contact with the magnetic recording film or medium 25 of the magnetic disk unit 22 transported by conveying device 50 between the disk driving device 24 and the stocking device 23.

The recording and reproducing circuit 58 is coupled to the arithmetic and control circuit 45, which, in turn, generates an operation fashion signal designating one of a recording operation and reproducing operation for the recording and reproducing circuit 58. The recording and reproducing device 57 carries out the operation designated by the operation fashion signal.

In the recording operation, the address signal is supplied to the recording and reproducing circuit 58 as a signal to be recorded from the arithmetic and control circuit 45. While, in the reproducing operation, a reproduced signal is supplied to the arithmetic and control circuit 45 from the recording and reproducing circuit 58.

Figure 6:
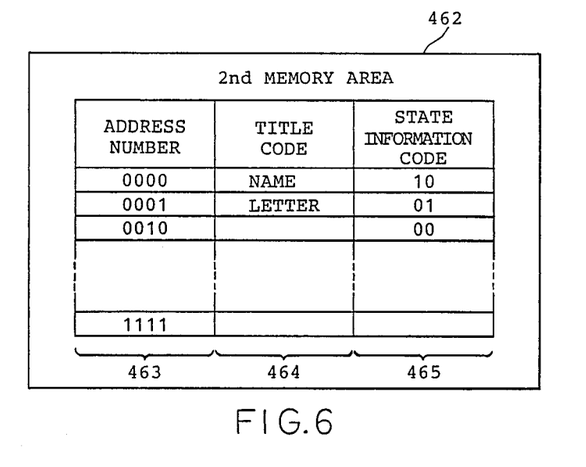
FIG. 6 is a diagram view for use in explaining contents in a memory circuit which is used in the information storage apparatus illustrated in FIG. 2.

Referring to FIG. 6, the memory circuit 46 (FIG. 2) has the second memory area 462 which is divided into an address number storing area 463, a title code storing area 464, and a state information code storing area 465. The address number storing area 463 stores the respective address numbers assigned to the respective stocking locations 39. The title code storing area 464 stores title codes, for example, "NAME", "LETTER", or others, of the series of filing information data in the manner which will later be described. The state information code storing area 465 stores state information codes representative of state information of the stocking locations 39 for the respective address numbers in the manner which will also later be described.

The state information code is "10", "01", or "00". Code "10" means that the flexible magnetic disk is full recorded. Code "01" means that the flexible magnetic disk is partially vacant or partially recorded. Code "00" means that the flexible magnetic disk is vacant or has no recorded information.

Description will now be made as regards recording operation of the information storage apparatus 20 with reference to FIGS. 1, 2, and 6.

It is assumed that the magnetic disk units 22 are stocked in respective stocking locations 39 and that the state information code storing area 465 stores a vacant code "00" for each of the address numbers stored in the address number storing area 463 as the state information code. The vacant code "00" represents that the filing information is not yet recorded into the flexible magnetic disk of the magnetic disk unit 22 stocked in the stocking location corresponding to the stored address number having the vacant code.

When the input/output circuit 44 receives the incoming signal which comprises a recording instruction, a series of filing information data to be recorded, and title of the filing information data, the input/output circuit 44 delivers the incoming signal to the arithmetic and control circuit 45. Then, the arithmetic and control circuit 45 accesses the memory circuit 46 to research a first specific address number having the vacant code "00" as the state information code of the stocking location with reference to the second memory area 462. The arithmetic and control circuit 45 thereby produces a first address signal representative of the first specific address number and the operation mode signal designating the magnetic recording operation. At that time, the arithmetic and control circuit 45 stores a title code representative of the title of the information data into a part of the title code storing area 464 corresponding to the first specific address number.

In response to the first address signal, the first driving circuit 47 drives the first motor 49 to rotate the cylindrical member 36 so as to position to the outlet and inlet position $P_{OI}$ a first specific stocking location corresponding to the first specific address number represented by the first address signal. That is, a first specific magnetic disk unit 22 stocked in the first specific stocking location is positioned at the outlet and inlet position $P_{OI}$. Then, the arithmetic and control circuit 45 drives the second motor 52 through the second driving circuit 55 to convey and load the first specific magnetic disk unit 22 into the disk driving device 24.

When the first specific magnetic disk unit 22 is loaded within the disk driving device 24, the disk driving device 24 carries out, according to the operation mode signal from the arithmetic and control circuit 45, the magnetic recording operation of the title of the series of filing information data and the series of filing information data into the flexible magnetic disk of the first specific magnetic disk unit 22 loaded therein. In this event, the series of filing information data and its title are delivered to the disk driving device 24 through the interface connector 43, the input/output circuit 44 and the arithmetic and control circuit 45.

When the series of filing information data is completely recorded into the flexible magnetic disk of the first specific magnetic disk unit 22, the arithmetic and control circuit 45 generates the drive stop signal for the disk driving device 24, and the drive signal for the second driving circuit 55 in response to the end signal in the incoming signal.

Then, the arithmetic and control circuit 45 accesses the memory circuit 46 to rewrite the vacant code "00" into the partially vacant code "01" or the full recorded code "10" in the part of the state information code storing area 465 corresponding to the first specific address number. When the series of filing information data is recorded into the flexible magnetic disk by the predetermined recording capacity, the full recorded code "10" is written into the area 465, but when the flexible magnetic disk has a residual vacant portion where another filing information can be recorded, the partially vacant code "01" is written into the area 465.

The disk driving device 24 stops in response to the drive stop signal supplied through the line 42. While, the second driving circuit 55 receives the driving signal through the line 56 and drives the second motor 55 in the reversed direction to restock the specific magnetic disk unit 22 from the disk driving device 24 to the specific stocking location in the stocking device 23 by the conveying device 50.

When the amount of the series of filing information data exceeds the vacant capacity of the flexible magnetic disk of the specific magnetic disk unit, the disk driving device 24 stops the magnetic recording operation and produces a stop informing signal. In other words, the disk driving device 24 produces the stop informing signal when the flexible magnetic disk is full recorded with the series of filing information data. On receiving the stop informing signal through a line 42, the arithmetic and control circuit 45 again accesses the memory circuit 46 to research a second specific address number having a vacant code with reference to the second memory area 462. The arithmetic and control circuit 45 thereby produces a second address signal representative of the second specific address number and the operation fashion signal designating the magnetic recording operation. The arithmetic and control circuit 45 also generates, in response to the stop informing signal, the driving signal for the second driving circuit 55. Thus, the restocking operation is carried out by the conveying device 50 so that the first specific magnetic disk unit 22 is returned to the first specific stocking location of the stocking device 23.

On the way of the restocking operation of the first specific magnetic disk unit to the stocking device 23, the first specific magnetic disk unit 22 passes through the magnetic recording and reproducing device 57. Then, the magnetic recording and reproducing device 57 carries out the recording operation of the second specific address number into the magnetic recording medium 25 in response to the operation fashion signal from the arithmetic and control device 45.

Thereafter, the arithmetic and control circuit 45 supplies a second address signal representative of the second specific address number to the first driving circuit 47. So that the first driving circuit 47 drives the first motor 49 to rotate the cylindrical member 36 to position to the outlet and inlet portion a second specific stocking location corresponding to the second specific address number represented by the second address signal. Thereafter, the second specific magnetic disk unit is loaded into the disk driving means 24 by the conveying device 50. Then, the residual portion of the series of information data to be recorded can be recorded into the flexible magnetic disk of the second specific magnetic disk unit, in the similar manner as described above.

Also, the title code is stored into a part of the title code storing area 464 corresponding to the second specific address number.

Similar operation is repeated until the arithmetic and control circuit 45 detects the end signal representative of an end of the series of filing information data in the incoming signal. On detection of the end signal, the arithmetic and control circuit 45 produces the drive stop signal. The drive stop signal is also delivered to the disk driving device 24 through the signal transmission line 42. Thereafter, the current or last specific magnetic disk unit is returned to the stocking device 23 in the similar manner, and the full recorded code or the partially vacant code is also stored into a part of the state information storing area corresponding to the last specific address number.

Now, description will be made as to the reproducing information from the flexible magnetic disk of the magnetic disk unit with reference to FIGS. 1, 2, and 6.

When the input/output circuit 44 receives another incoming signal comprising the reproducing instruction, and a title of a series of filing information data to be reproduced, the input/output circuit 44 delivers the incoming signal to the arithmetic and control circuit 45. Then, the arithmetic and control circuit 45 researches a first particular address number having a title code representative of the title of the series of filing information data with reference to the second memory area 462. The arithmetic and control circuit 45 thereby produces a first particular address signal representative of the first particular address number and an operation mode signal designating the magnetic reproducing operation.

After the first particular address signal is received at the first driving circuit 47 through line 48, a first particular magnetic disk unit of the first particular stocking location represented by the first address signal is loaded into the disk driving device 24 by operation of the transporting device comprising the first and the second driving circuits 47 and 55 and the first and second motors 49 and 52 in the similar manner to the transporting and loading operation in the recording operation as described above.

When the first particular magnetic disk unit is loaded into the disk driving device 24, the disk driving device 24 carries out the reproducing operation of the series of filing information data with the title from the flexible magnetic disk of the first particular magnetic disk unit in response to the operation mode signal. Thus, the series of filing information data as reproduced is transmitted to the information processing device 21 through the input/output circuit 44 as the outgoing signal.

When all of the series of filing information data with the title is reproduced out of the flexible magnetic disk of the first particular magnetic disk unit 22, the arithmetic and control circuit 45 produces the drive stop signal and the disk driving device 24 accordingly stops the magnetic reproducing operation. Then, the arithmetic and control circuit 45 supplies the driving signal to the second driving circuit 55. Therefore, the first particular magnetic disk unit is returned to the stocking device 23 in the similar restocking manner as described above in connection with the recording operation.

When the series of filing information data to be reproduced is recorded in a plurality of flexible disks, the disk driving device 24 stops the magnetic reproducing operation from the flexible magnetic disk of the first particular magnetic disk unit and generates a stop informing signal. In other words, the disk driving device 24 produces the stop informing signal when the disk driving device 24 completes reproduction of the portion of the series of the filing information data recorded on the flexible magnetic disk of the first particular magnetic disk unit.

When the arithmetic and control circuit 45 receives the stop informing signal through the line 42, the arithmetic and control circuit 45 produces the driving signal, which is applied to the second driving circuit 55 through the line 56. Then the restocking operation of the particular magnetic disk unit is performed in the similar manner as described above.

In this event, the arithmetic and control circuit 45 produces an operation fashion signal designating magnetic reproducing which is applied to the recording and reproducing circuit 58. Then, the magnetic recording and reproducing device 57 operates and reproduces a second particular address number from the magnetic film 25 of the first particular magnetic disk unit 22 by the accessing head 59 which is in contact with the magnetic film 25. The second particular address number is applied to the arithmetic and control circuit 45.

The arithmetic and control circuit 45 produces the operation mode signal and a second particular address signal representative of the second particular address number. The second address number is applied to the first driving circuit 47. Therefore, a second particular magnetic disk unit in a second particular stocking location corresponding to the second particular address number represented by the second particular address signal is loaded into the disk driving device 24 in a manner similar to the transporting and loading operation of the first particular magnetic disk unit 22. The arithmetic and control circuit 45 controls the disk driving device 24 by the operation mode signal to reproduce the residual portion of the series of information data from the flexible magnetic disk of the second particular magnetic disk unit 22 loaded in the disk driving device 24 in the similar manner as described before.

A sequence of the disk loading operation, reproducing operation, and disk restocking operation is repeated until the series of filing information data is entirely reproduced.

The series of filing information data as reproduced is transmitted as the outgoing signal to the information processing device 21 through the input/output circuit 44.

As described above, the information storage apparatus 20 is capable of automatically recording a series of filing information data into a plurality of the flexible magnetic disks 22 in succession even if the amount of the series of filing information data for one title exceeds the predetermined recording capacity of each of the magnetic disk units 22. On reproducing the series of filing information data from the magnetic disk units 22, it is easy to select a next succeeding magnetic disk unit 22 succeeding a current magnetic disk unit 22 under reproduction with reference to the address number recorded into the magnetic film 25 of the current magnetic disk unit 22.

Information to be recorded into the magnetic film 25 of the magnetic disk unit 22 may comprise a title code of a series of filing information data together with either an address number of a stocking location stocking a magnetic disk unit recording the next succeeding portion of the series of the filing information data or an order number representative of recording order of the magnetic disk unit on recording the series of filing information data into the magnetic disk units instead of the address number of the next succeeding magnetic disk unit. In that case, the title code is not necessary to be stored in the memory circuit 46. However, it is preferable to store the title code in the memory circuit for a high speed operation of the information storage apparatus.

Further, when the recording order number is stored in the memory circuit 46 together with the title code, it will be understood that the magnetic film 25 and the magnetic recording and reproducing device 57 can be omitted.

The stocking device 23 may be removable from an inner surface of the housing 35 so that the stocking device 23 can be exchanged for another stocking device on backup. As mentioned before, the information storage apparatus 20 has a large recording capacity by the use of a plurality of magnetic disk units 22. In addition, backup for protection of memorized information of the magnetic disk unit is easily made by exchange of the magnetic disk unit.

While this invention has thus far been described in conjunction with a preferred embodiment thereof, it will readily be possible for those skilled in the art to put this invention into practice in various other manners. In FIG. 1, each of the magnetic disk units 22 may be exchanged for a magnetic disk unit wherein the shutter 29 is removed from the container 26. Alternatively, a magnetic disk unit having a container of the first type (namely, a soft jacket) described in the preamble of the instant specification may be used instead of each of the magnetic disk units 22 in FIG. 1. In this case, the magnetic recording medium 25 should be formed on an outer surface of the container of the first type.

What is claimed is:

1. A large capacity information storage apparatus for use in combination with an information processing device, said apparatus comprising:
    a plurality of magnetic disk units, each of said magnetic disk units comprising a container, a flexible magnetic disk having a predetermined recording capacity for magnetically recording information, and a magnetic recording medium mounted on an outer surface of said container, said magnetic recording medium being arranged for magnetically recording control data;
    stocking means having a plurality of stocking locations for stocking said plurality of magnetic disk units in different stocking locations, individually, said stocking locations being assigned with different address numbers;
    disk driving means for carrying out an operation of either a magnetic recording or a magnetic reproducing of a series of filing information data on the flexible magnetic disk of a magnetic disk unit loaded within said disk driving means, said one of the magnetic recording and magnetic reproducing operations being designated by an operation mode signal;
    signal receiving and transmitting means for receiving an incoming signal from said information processing device and for transmitting an outgoing signal to said information processing device;
    signal processing means coupled to said signal receiving and transmitting means and responsive to said incoming signal for processing said incoming signal into said operation mode signal and an address signal representative of a specific one of said address numbers;
    transporting means responsive to said address signal for transporting and loading to said disk driving means a specific one of said magnetic disk units stocked in a specific one of said stocking locations corresponding to said specific address number represented by said address signal; and
    recording and reproducing means coupled to said signal processing means and having an accessing head, said recording and reproducing means being disposed between said stocking means and said disk driving means so that said accessing head comes into contact with said magnetic recording medium of said specific magnetic disk unit transported by said transporting means between said disk driving means and said stocking means so as to carry out either of a magnetic recording or a magnetic reproducing operation of said control data on the magnetic recording medium of said specific magnetic disk unit, the magnetic recording or the magnetic reproducing of said control data being designated by an operation fashion signal.

2. A large capacity information storage apparatus as claimed in claim 1, said incoming signal comprising a recording instruction, a series of filing information data to be recorded, and a title of said series of filing information data, wherein said signal processing means processes said incoming signal into said address signal and said operation mode signal designating the magnetic recording operation, so that said disk driving means carries out the magnetic recording operation of said series of filing information data with said title into the flexible magnetic disk of said specific magnetic disk unit loaded therein.

3. A large capacity information storage apparatus as claimed in claim 2, said incoming signal further comprising an end signal representative of an end of said series of filing information data, wherein said signal processing means processes said end signal into a drive stop signal and a return signal, said disk driving means stopping the magnetic recording operation in response to said drive stop signal, said transporting means transporting, in response to said return signal, said specific magnetic disk unit from said disk driving means to said specific stocking location of said stocking means.

4. A large capacity information storage apparatus as claimed in claim 2, wherein said signal processing means comprises:
    memory means having a first memory area for storing an operation program and a second memory area for storing a list of said respective address numbers of said a plurality of stocking locations, title codes of the series of filing information data recorded into respective flexible magnetic disks in said stocking locations corresponding to said respective address numbers, and state information for indicating whether or not each of said flexible magnetic disks corresponding to said respective address numbers has a vacant recording zone; and
    arithmetic and control means coupled to said memory means and said signal receiving and transmitting means and responsive to said incoming signal for carrying out arithmetic and control operation with reference to said operation program and said list within said first and said second memory areas, whereby said arithmetic and control means produces the operation mode signal designating the magnetic recording operation and said address signal representative of, as said specific address number, an address number of that one of the magnetic disk units which has the vacant recording zone.

5. A large capacity information storage apparatus as claimed in claim 1, said incoming signal comprising a reproducing instruction and a title of a series of filing information data to be reproduced, wherein said signal processing means processes said incoming signal into said address signal and said operation mode signal designating said magnetic reproducing operation, said address signal being representative of a particular address number of said specific address number, said particular address number being assigned to a particular stocking location which stocks, as said specific magnetic disk unit, a particular magnetic disk unit containing the flexible magnetic disk which records the series of filing information data having said title, said disk driving means thereby carrying out said magnetic reproducing operation of said series of filing information data having said title from the flexible magnetic disk of said particular magnetic disk unit loaded therein to produce a reproduced signal, said signal receiving and transmitting means transmitting said reproduced signal as said outgoing signal to said information processing device.

6. A large capacity information storage apparatus as claimed in claim 5, wherein said signal processing means produces a drive stop signal and a return signal when a whole of said information data is reproduced from the flexible magnetic disk of said particular magnetic disk unit loaded therein, said disk driving means stopping said reproducing operation in response to said drive stop signal, said transporting means transporting, in response to said return signal, said particular magnetic disk unit from said disk driving means to said particular stocking location of said stocking means.

7. A large capacity information storage apparatus as claimed in claim 5, wherein said signal processing means comprises:
memory means having a first memory area for storing an operation program and a second memory area for storing a list of said respective address numbers of said a plurality of stocking locations, title codes of the series of filing information data recorded into respective flexible magnetic disks in said stocking locations corresponding to said respective address numbers, and state information for indicating whether or not each of said flexible magnetic disks corresponding to said respective address numbers has a vacant recording zone; and
arithmetic and control means coupled to said memory means and said signal receiving and transmitting means and responsive to said incoming signal for carrying out arithmetic and control operation with reference to said operation program and said list within said first and said second memory areas, whereby said arithmetic and control means produces the operation mode signal designating the magnetic reproducing operation and said address signal representative of, as said particular address number, an address number of that one of the magnetic disk units which has the title code corresponding to said title included in said incoming signal.

8. A large capacity information storage apparatus as claimed in claim 1, said incoming signal comprising a reproducing instruction and a title of a series of filing information data to be reproduced from the flexible magnetic disk, wherein said signal processing means processes said incoming signal into said address signal and said operation mode signal designating said magnetic reproducing operation, said address signal being representative of a particular address number as said specific address number, said particular address number being assigned to a particular stocking location which stocks, as said specific magnetic disk unit, a particular magnetic disk unit containing the flexible magnetic disk which records the series of filing information data having said title, said disk driving means thereby carrying out said magnetic reproducing operation of said series of filing information data having said title from the flexible magnetic disk of said particular magnetic disk unit loaded therein to produce a reproduced signal, said signal receiving and transmitting means transmitting said reproduced signal as said outgoing signal to said information processing device, said disk driving means stopping said magnetic reproducing operation to produce a stop informing signal when a portion of said series of information data is reproduced from the flexible magnetic disk of the particular magnetic disk unit loaded therein without the other residual portion of said series of filing information data being produced from the flexible magnetic disk of said particular magnetic disk unit, said signal processing means producing, in response to said stop informing signal, a return signal and said operation fashion signal designating said magnetic reproducing operation, said transporting means transporting and loading, in response to said return signal, said particular magnetic disk unit from said disk driving means to said particular stocking location of said stocking means, said recording and reproducing means carrying out, in response to said operation fashion signal, said magnetic reproducing operation of said control data from the magnetic recording medium of said particular magnetic disk unit which said transporting means transports from said disk driving means to said particular stocking location of said stocking means, said signal processing means producing, in response to said control data reproduced, an especial address signal, as said address signal, representative of an especial one of address numbers, said transporting means thereafter transporting and loading, in response to said especial address signal, to said disk driving means an especial one as said particular magnetic disk unit of said magnetic disk units stocked in an especial one of said stocking locations corresponding to said especial address number represented by said especial address signal, so that said disk driving means carries out the magnetic reproducing operation of said the other residual portion of said series of filing information data from said especial magnetic disk unit loaded therein.

9. A large capacity information storage apparatus as claimed in claim 8, wherein said signal processing means produces a drive stop signal and said return signal when a whole of said series of information data is reproduced from the flexible magnetic disk of said especial magnetic disk unit loaded therein, said disk driving means stopping the reproducing operation in response to said drive stop signal, said transporting means transporting, in response to said return signal, said especial magnetic disk unit from said disk driving means to said especial stocking location of said stocking means.

10. A large capacity information storage apparatus as claimed in claim 8, wherein said signal processing means comprises:

- memory means having a first memory area for storing an operation program and a second memory area for storing a list of said respective address numbers of said a plurality of stocking locations, title codes of the series of filing information data recorded into respective flexible magnetic disks stocked in said stocking locations corresponding to said respective address numbers, and state information for indicating whether or not each of said flexible magnetic disks corresponding to said respective address numbers has a vacant recording zone; and
- arithmetic and control means coupled to said memory means and said signal receiving and transmitting means and responsive to said incoming signal for carrying out arithmetic and control operation with reference to said operation program and said list within said first and said second memory areas, whereby said arithmetic and control means produces the operation mode signal designating the magnetic reproducing operation and said address signal representative of, as said particular address number, an address number of that one of the magnetic disk units which has the title code corresponding to said title included in said incoming signal.

11. A large capacity information storage apparatus as claimed in claim 1, said incoming signal comprising a recording instruction, a series of filing information data to be recorded into the flexible magnetic disk, and a title of said series of filing information data, wherein said signal processing means processes said incoming signal into said address signal and said operation mode signal designating the magnetic recording operation, so that said disk driving means carries out the magnetic recording operation of said series of filing information data with said title into the flexible magnetic disk of said specific magnetic disk unit loaded therein, said disk driving means stopping the magnetic recording operation to produce a stop informing signal when the flexible magnetic disk of the specific magnetic disk unit loaded therein is fully recorded by a portion of said series of filing information data with the other residual portion being not yet recorded, said signal processing means producing, in response to said stop informing signal, a special one of said address numbers except said specific address number, a return signal, and said operation fashion signal designating said magnetic recording operation, said transporting means transporting, in response to said return signal, said specific magnetic disk unit from said disk driving means to said specific stocking location of said stocking means, said recording and reproducing means carrying out the magnetic recording operation of said special address number as said control data into the magnetic recording medium of said specific magnetic disk unit which said transporting means transports from said disk driving means to said specific stocking location of said stocking means, said signal processing means thereafter producing a special address signal, as said address signal, representative of said special address number of said specific address number, said transporting means transporting and loading, in response to said special address signal, to said disk driving means a special one of said magnetic disk units, as said specific magnetic disk unit, stocked in a special one of said stocking locations corresponding to said special address number represented by said special address signal, so that said disk driving means carries out the magnetic recording operation of said the other residual portion of said series of filing information data into said special magnetic disk unit loaded therein.

12. A large capacity information storage apparatus as claimed in claim 11, said incoming signal further comprising an end signal representative of an end of said series of information data, wherein said signal processing means processes said end signal into a drive stop signal and said return signal, said disk driving means stopping the operation in response to said drive stop signal, said transporting means transporting, in response to said return signal, said special magnetic disk unit from said disk driving means to said special stocking location of said stocking means.

13. A large capacity information storage apparatus as claimed in claim 11, wherein said signal processing means comprises:

- memory means having a first memory area for storing an operation program and a second memory area for storing a list of said respective address numbers of said a plurality of stocking locations, title codes of the series of filing information data recorded into respective flexible magnetic disks stock in said stocking locations corresponding to said respective address numbers, and state information for indicating whether or not each of said flexible magnetic disks corresponding to said respective address numbers has a vacant recording zone; and
- arithmetic and control means coupled to said memory means and said signal receiving and transmitting means and responsive to said incoming signal for carrying out arithmetic and control operation with reference to said operation program and said list within said first and said second memory areas, whereby said arithmetic and control means produces the operation mode signal designating the magnetic recording operation and said address signal representative of, as said specific address number, an address number of that one of the magnetic disk units which has the vacant recording zone.

14. A large capacity information storage apparatus as claimed in claim 1, wherein said stocking means comprises:

- a cylindrical member having a center axis and an outer cylindrical surface around said center axis, said cylindrical member being rotatable around said center axis, said cylindrical member having said a plurality of stocking locations angularly spaced from an another on said outer cylindrical surface; and
- a plurality of catching means being fixed at said stocking locations on said outer cylindrical surface, respectively, for catching said a plurality of the magnetic disk units, respectively.

15. A large capacity information storage apparatus as claimed in claim 14, wherein said stocking means is provided with an outlet and inlet position, said transporting means comprising;

- rotating means responsive to said address signal for rotating said cylindrical member so as to position said specific stocking location to said outlet and inlet position; and
- conveying means being disposed to move between said outlet and inlet position and said disk driving means, said conveying means conveying said specific magnetic disk unit between said disk driving means and said specific stocking location positioned to said outlet and inlet position.

* * * * *